US011720947B2

(12) United States Patent
Indrakanti et al.

(10) Patent No.: US 11,720,947 B2
(45) Date of Patent: Aug. 8, 2023

(54) METHOD, MEDIA, AND SYSTEM FOR GENERATING DIVERSE SEARCH RESULTS FOR PRESENTING TO A USER

(71) Applicant: eBay Inc., San Jose, CA (US)

(72) Inventors: Saratchandra Indrakanti, Pleasanton, CA (US); Manojkumar Rangasamy Kannadasan, Freemont, CA (US); Rajyashree Mukherjee, San Carlos, CA (US); Svetlana Strunjas, Menlo Park, CA (US); Shubhangi Tandon, San Jose, CA (US)

(73) Assignee: EBAY INC., San Jose, CA (US)

( * ) Notice: Subject to any disclaimer, the term of this patent is extended or adjusted under 35 U.S.C. 154(b) by 417 days.

(21) Appl. No.: 16/655,935

(22) Filed: Oct. 17, 2019

(65) Prior Publication Data
US 2021/0118034 A1  Apr. 22, 2021

(51) Int. Cl.
G06Q 30/0601 (2023.01)
G06F 16/2457 (2019.01)
G06F 16/248 (2019.01)

(52) U.S. Cl.
CPC ....... *G06Q 30/0625* (2013.01); *G06F 16/248* (2019.01); *G06F 16/24578* (2019.01)

(58) Field of Classification Search
CPC .. G06Q 30/0601–0645; G06Q 30/0625; G06F 16/24578; G06F 16/248
See application file for complete search history.

(56) References Cited

U.S. PATENT DOCUMENTS

| 9,818,142 B2 | 11/2017 | Wang et al. |
| 10,102,559 B1 * | 10/2018 | Jain ................... G06Q 30/0631 |
| 2008/0154878 A1 * | 6/2008 | Rose ................... G06F 16/9535 |
| | | 707/999.005 |
| 2011/0252031 A1 | 10/2011 | Blumenthal et al. |

(Continued)

OTHER PUBLICATIONS

Barry Schwartz, Google search update aims to show more diverse results from different domain names, Search Engine Land, Jun. 6, 2019 (Year: 2019).*

(Continued)

*Primary Examiner* — Marissa Thein
*Assistant Examiner* — Anna Mae Mitros
(74) *Attorney, Agent, or Firm* — Shook, Hardy & Bacon L.L.P.

(57) ABSTRACT

A search engine provides diverse search results in response to a search query using a trained diversity ranker. The diverse results may be generated by determining ranking positions of at least some search results based on delta feature values that are dependent on higher-ranked results. Delta feature values indicate a degree or magnitude of difference between a particular result and other results with respect to a particular feature, such as price, category, or shipping type. In providing the ranked results for presentation to a user at a computing device, a diversity feature indicator for at least some results may be generated. The diversity feature is a feature that distinguishes a given result from other results. As such, the diversity feature indicator represents that diversity feature for the particular result being different from other results and distinguishes the diversity feature from other features in the particular result.

20 Claims, 10 Drawing Sheets

(56) References Cited

U.S. PATENT DOCUMENTS

2012/0265647 A1* 10/2012 Negrillo .............. G06F 16/9038
707/E17.014
2016/0342288 A1* 11/2016 Konik ................ G06Q 30/0643

OTHER PUBLICATIONS

Indrakanti, et al., "Exploring the Effect of an Item's Neighborhood on its Sellability in eCommerce", eBay Inc., 2019, 4 pages.
Zhu, et al., "Learning for Search Result Diversification", Institute of Computing Technology, 2014, pp. 293-302.

* cited by examiner

METHOD, MEDIA, AND SYSTEM FOR GENERATING DIVERSE SEARCH RESULTS FOR PRESENTING TO A USER

BACKGROUND

Traditional rankers for Internet search results base rankings on scores computed independently of other results. However, users typically browse results in a top-down direction, and in evaluating the results, a user's perception of a result is influenced by previously viewed results. As such, ranking results based on independently computed scores for each item does not accurately reflect how the rankings will be perceived by the user and may not yield useful results. Further, when results are ranked based on independent considerations, the presented search results do not provide the user with differentiating information in a meaningful way to reflect the interdependencies of the search results. Instead, visual highlights of features within the results are independently generated in that they are based on certain features for that particular result only (e.g., highlighting a feature based on the feature of that result matching a search word). To recognize a difference in particular results, users must compare feature values without readily knowing whether the feature values are even different between two or more results, and a user is more likely to overlook a distinguishing feature that would aid in the user selecting a result. Providing less meaningful search results makes it more difficult for a user to locate a desired search result, forcing the user to attempt different search queries to refine the results and ultimately increasing processing requirements on the search engine and causing the search engine to transmit more data to the user than necessary, which adds to network traffic and decreases available internet bandwidth.

SUMMARY

At a high level, aspects described herein relate to a search engine that provides diverse search results generated using a diversity ranker and that include diversity feature indicators when presented to the user. Upon receipt of a search query, a set of item listings are identified as relevant to the query. A diversity ranker is applied to the retrieved item listings to generate a diverse ranking in which the ranking positions of at least some of the item listings are dependent on differences with other item listings. Generating the diverse ranking includes utilizing delta feature values for determining a ranking position of at least some of the item listings. Delta feature values are determined by computing a degree or magnitude of difference in feature values between a particular item listing and other item listings, such as higher-ranked item listings.

After generating the diverse ranking of search results, the ranking is provided as search results for presentation at a client computing device. At least some item listings provided for presentation include a diversity feature indicator that represents a diversity feature for a particular item listing being different from higher-ranked item listings. The diversity feature indicator also distinguishes the diversity feature from other features in the particular item listing. The diversity feature indicator may be a visual or audio indicator. For example, the indicator may include a particular visual format or font for an existing textual indicator (e.g., highlighting, bolding and/or italicizing text), a new text indicator, or an icon or image. In other aspects, the diversity feature indictor may include an audio message.

This summary is intended to introduce a selection of concepts in a simplified form that is further described in the detailed description section of this disclosure. The summary is not intended to identify key or essential features of the claimed subject matter, nor is it intended to be used as an aid in determining the scope of the claimed subject matter. Additional objects, advantages, and novel features of the technology will be set forth in part in the description which follows, and in part will become apparent to those skilled in the art upon examination of the disclosure or learned through practice of the technology.

BRIEF DESCRIPTION OF THE DRAWINGS

The present technology is described in detail below with reference to the attached drawing figures, wherein.

DETAILED DESCRIPTION

Figure 1:
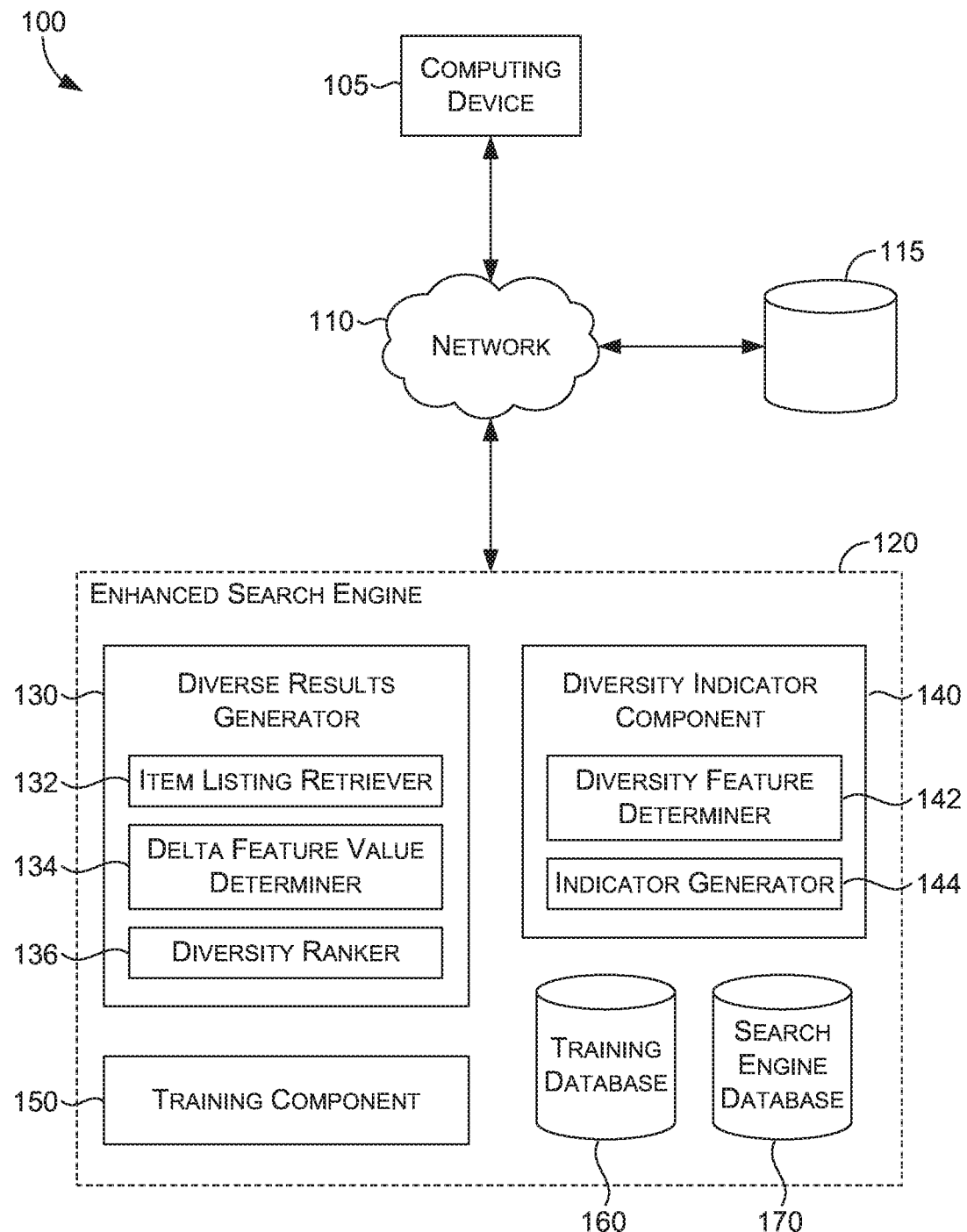
FIG. 1 is an example configuration of an environment in which one or more implementations of the present disclosure may be employed.

In response to a search query, online search engines provide search results that may include item listings. As used herein, an item listing includes any search result for an item, which refers to a piece of information available on the Internet that may be accessible to a search engine, such as products, images, services, webpages, videos, etc. Due to the volume of item listings that may be identified for any given search query, it may be difficult for a user to locate relevant item listings, and the ability to rank listings in a manner that facilitates easy location of a desired item listing helps to prevent additional searching.

Traditional rankers for search results base rankings on scores computed independently of other results. However, users typically browse results in a top-down direction (referred to herein as top-down browsing), and in evaluating the results, a user's perception of a result is influenced, either consciously or subconsciously, by previously viewed results. In the context of ecommerce searching, this top-down browsing approach may be particularly impactful where a user may ultimately select only one result to purchase and, as such, more often engages in a comparative exercise of comparing and contrasting items with previously viewed items (which are typically higher-ranked items) to determine what item to select. As such, ranking results based on independently computed scores for each item does not accurately reflect how the rankings will be perceived by the user and may not yield useful results. For example, a user searching for Nike® women's shoes may simply use "Nike" as the search query and be provided with the top fifteen search results all being men's shoes if men's shoes individually have higher sellability scores. The user may then have to request display of additional search results or refine the search to eventually be provided with the desired women's shoe result.

Further, by considering each result independently when providing the rankings, the presented search results do not provide the user with differentiating information in a meaningful way to reflect the interdependencies of the search results. Instead, visual highlights of item features within the results are independent in that they are only based on certain features for that particular item (e.g., highlighting a feature based on the feature of the result matching a search word). To recognize a difference in particular items, users must compare feature values between results without readily knowing whether the feature values are even different between two or more items, and a user is more likely to overlook a distinguishing feature that would aid in the user selecting (and in the context of ecommerce, purchasing) an item. Providing less meaningful search results makes it more difficult for a user to locate a desired search result, forcing the user to attempt different search queries to refine the results to better align with what the user would like and ultimately increasing processing requirements on the search engine and causing the search engine to transmit more data to the user than necessary, which adds to network traffic and decreases available internet bandwidth.

The technology disclosed herein relates to a search engine that solves these challenges by diversifying search results and providing perceptible indicators (such as visual or audio indicators) that facilitate quick identification of the distinguishing features between different results. When a search engine receives a search query from a user, a set of item listings is identified as being relevant to the search query, and the item listings are ranked in an order that will be provided to the user. Generally, determining a ranking includes determining a relevancy score for each item listing based on feature values (e.g., price, brand, item category) for a given item listing. Unlike with traditional search systems, the ranking provided to the user according to the disclosed technology is at least partly based on delta feature values for features as a measurement of diversity between item listings. In this way, the relevancy scores determined for ranking are not generated using only independently determined feature values.

A delta feature value for a particular item listing measures a degree of difference with respect to a feature between the particular item listing and one or more other listings within the ranking. In exemplary configurations, the other item listings considered are higher-ranked item listings and may be immediately preceding the particular item listing within a ranking. The specific higher-ranked item listings that are compared to a particular item listing may be determined based on a predefined neighborhood size. For example, where the neighborhood is defined as three, a delta feature value for a feature of a particular item listing indicates a degree of difference between the feature value of that particular item listing and feature values of the three(?) immediately preceding (higher-ranked) item listings.

Generating the diverse ranking may include first determining an initial ranking using independently-determined feature values without delta feature values. The first ranking may be used to then generate a second ranking using delta feature values determined based on the first ranking. The ranking positions of a subset of the item listings may be based on the first ranking only, where the ranking positions of another subset of item listings may be based on delta feature values. For example, the first subset may be one item listing such that the first item listing in the first ranking remains as the first item listing in the second ranking, and determining item listings to place in lower ranking positions may be based at least partly on delta feature values as computed in accordance with a predefined neighborhood size and type. Further, neighborhood sizes used to compute delta feature values may vary based on the particular ranking position. Regular (non-delta) feature values may also be used with the delta feature values in determining the ranking position of item listings. In this way, search results incorporate a user's top-down browsing approach and provide diverse results while still being relevant to the query, which increases the likelihood of a user finding a desired search result without performing additional searching.

To facilitate a user's ability to easily perceive the diversity between the results, the disclosed technology further includes generating diversity feature indicators that are provided with the diverse ranking of search results. A diversity feature is a distinguishing feature of a particular item listing and is determined based on impact values for all of the delta feature values used when ranking that item listing. An impact value indicates an amount of influence a delta feature value had on ranking an item listing, and, in exemplary configurations, the feature that is associated with the delta feature value having the highest impact value is identified as the diversity feature for that item listing. Different item listings may have different diversity features.

As such, after applying a diversity ranker to determine a diverse ranking, a diversity feature is determined for at least some of the item listings. A graphic user interface for presenting the search results with diversity feature indicators is generated. The indicator may be a visual or audio indicator and reflects the fact that the item listing is different from other item listings with respect to the diversity feature. Further, the diversity feature indicator distinguishes that feature from other features within the item listings. A visual diversity feature indicator may include a particular format or font for an existing textual indicator (e.g., highlighting, bolding and/or italicizing text), a new text indicator, or an icon or image. Alternatively or additionally, an audio indicator may be provided.

While the present technology is presented herein in the context of a search engine returning items that may be purchased by the user, it will be recognized that this is only one example use scenario in which the described technology may be employed. One of ordinary skill in the art will appreciate that the underlying technical methods described herein for recalling, ranking, and providing information in response to an Internet search query are applicable across many different contexts. It is impractical to describe all of the various contexts in which the technology can be employed. Thus, for simplicity and consistency, the technology will continue to be described in the context of ecommerce.

In view of this, it should become apparent that the technology of this application solves problems that are rooted in and arise from the use of the Internet. Locating information stored at various connected servers and effectively presenting it to a user is a technological challenge and limitation of the Internet. The use of the Internet is only as good as the ability to locate desired information stored at one computing device and remotely recall that information for presentation at another computing device. Due to the vast amount of information on the Internet, however, identifying and recalling search results do not permit effective navigation and use of the Internet unless items are ranked in a meaningful way. In this way, ranking the identified and recalled information may be considered essential to the functioning of the Internet and a user's ability to use the Internet to identify the vast amounts of information stored at an innumerable number of remote servers.

The technology described herein provides solutions to these problems. For instance, by utilizing delta feature values that are dependent on other item listings, the search engine can apply a diverse ranker to generate diverse search results as opposed to employing a generic search ranker. Thus, the search engine provides results that are not only relevant to the search query but also embody different feature options to increase the likelihood that a user will find a desired search result without browsing through many pages of results or performing additional searches. Additionally, visual or audio indicators for a diversity feature that distinguishes the search result from other results may be provided with the search results. The diversity feature indicator not only distinguishes a result from other results with respect to that particular feature but distinguishes that feature from other features provided for that result. As such, a user can easily perceive how the search result is different from other results to allow the user to more easily identify the desired result. Based on this presentation of diverse search results with diversity feature indicators, the search engine receives fewer queries because users are more likely to be provided and find the search results relevant to that particular user. Consequently, there is more available computational processing power available for the search engine to perform other tasks. Further, because less data is being transmitted, network bandwidth and overall Internet traffic generally are reduced.

Turning now to FIG. 1, an example environment 100 is illustrated in which implementations of the present disclosure may be employed. In particular, FIG. 1 illustrates a high level architecture of environment 100 having components in accordance with implementations of the present disclosure.

Regarding environment 100, it is noted that any number of components may be employed to achieve the desired functionality within the scope of the present disclosure. Although the various components of FIG. 1 are shown with lines for the sake of clarity, in reality, delineating various components is not so clear, and metaphorically, the lines may more accurately be grey or fuzzy. Further, although some components of FIG. 1 are depicted as single components, the depictions are intended as examples in nature and in number and are not to be construed as limiting for all implementations of the present disclosure.

Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, or software. For instance, various functions may be carried out by a processor executing instructions stored in memory.

Among other components or engines not shown, environment 100 includes computing device 105. Computing device 105 is shown communicating, using network 110, to enhanced search engine 120, which may also communicate to storage 115. The components of environment 100 may communicate with each other over one or more networks (e.g., public network or virtual private network) as shown with network 110, which may be wired, wireless, or both. Network 110 may include multiple networks or a network of networks, but it is shown in simple form so as not to obscure aspects of the present disclosure. Network 110 may include, without limitation, one or more local area networks (LANs), wide area networks (WANs), or any other communication network or method.

Figure 6:
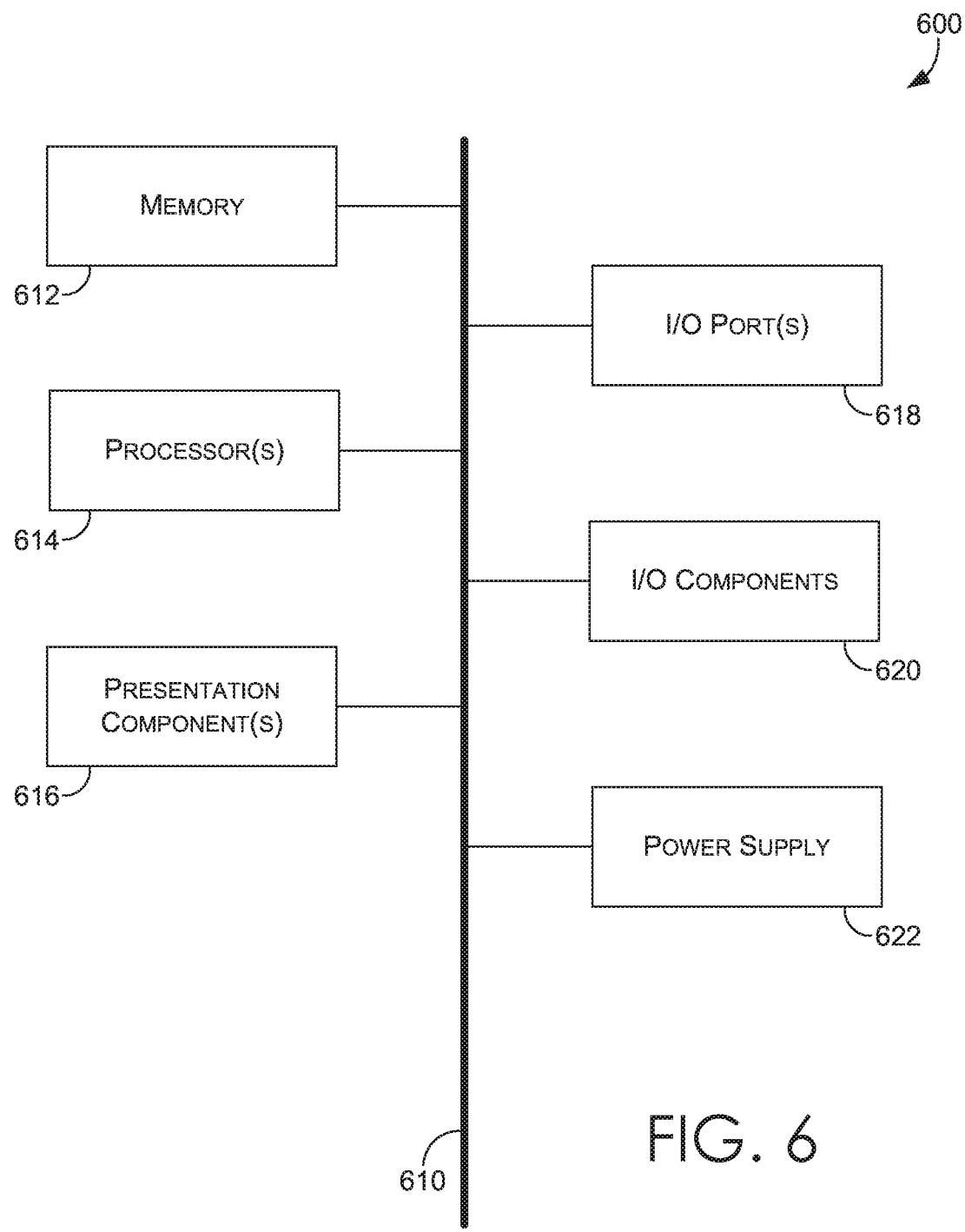
FIG. 6 is a block diagram of an example computing environment suitable for use in implementing aspects described herein.

Computing device 105 may be a client computing device that corresponds to the computing device described herein with reference to FIG. 6. As such, computing device 105 may include one or more processors and one or more computer-storage media. The computer-storage media may include computer-readable instructions executable by the one or more processors. The instructions may be embodied by one or more applications. Computing device 105 may include one or more applications capable of facilitating the exchange of information between computing device 105 and one or more components of enhanced engine 120. In some implementations, this application is a web application that can run in a web browser and could be hosted at least partially on the server-side of environment 100. In some cases, the application is integrated into the operating system (e.g., as a service). It is, therefore, contemplated herein that "application" be interpreted broadly.

Enhanced search engine 120 is generally responsible for providing diverse search results, including item listings, based on a search query. As used herein, the term "diverse search results" refers to a set of search results that are arranged at least partly based on diversity of features between results in a predetermined vicinity within the ranking. For instance, if the predetermined vicinity, which is also referred to herein as a neighborhood, is two, a search result is placed at a particular ranking position based at least partly on the diversity of features between that item and the two preceding items. In exemplary aspects, the diverse search results are provided using a trained ranking model and are presented with one or more diversity feature indictors highlighting diversity between one or more search results. In example environment 100, enhanced search engine 120 is illustrated as including diverse results generator 130, diversity indicator component 140, training component 150, training database 160, and search engine database 170. Enhanced search engine 120 may communicate with other components of environment 100 using network 110.

Search engine database 170 (and similarly storage 115) generally stores information including data, computer instructions (e.g., software program instructions, routines, or services), or models used in configurations of the described technologies. Although each depicted as a single database structure, search engine database 170 and storage 115 may be embodied as one or more data stores or may be in the cloud.

Diverse results generator 130 of enhanced search engine 120 is generally responsible for determining a diverse ranking of search results for a given query. Diverse results generator 130 includes item listing retriever 132, delta feature value determiner 134, and diversity ranker 136. Item listing retriever 132 generally identifies stored item listings related to a provided search query. The item listings may be associated with items for sale. The set of item listings may be identified based on their relevancy to the search query. The set of item listings identified for a particular search query may be referred to as the recall for that search query. Recall includes all items identified as relevant for the search query regardless of whether the item is included within the search results provided to the user. Item listings may be stored remotely (e.g., a third-party seller) on storage 115.

Additionally or alternatively, item listings may be stored at enhanced search engine 120 (e.g., a first-party seller) on search engine database 170.

To identify an item listing for inclusion within the recall, item listing retriever 132 may determine the relevancy of the item listing to the search query. Each item listing includes a number of associated features, which refers to attributes of the item, seller and/or offer to sell, and relevancy may be determined based on the features of each item listing. Item listing retriever 132 may determine relevancy based on words common between the search query and an item listing, including features associated with the item listing. Item listing retriever 132 may identify additional search criteria for determining relevancy by using query expansion on the search query. For example, a search query may be expanded to include synonyms of keywords within the search query. The item listings may be identified as relevant based on common keywords and keyword synonyms. In some cases, item listing retriever 132 utilizes vector space searching to determine whether an item listing is relevant to the search query. It will be appreciated that any method for determining relevancy of a stored item listing to a search query may be used.

Diversity ranker 136 is generally responsible for ranking, or ordering, the retrieved item listings for a search query according to one or more objectives. In exemplary configurations, one objective of diversity ranker 136 is relevance as measured by revenue, purchases, add to carts, bids, or a combination thereof (which may all be referred to as conversion). Diversity ranker 136 may utilize one or more machine learning models, such as a learning-to-rank model, to generate the ranking. The machine learning models may be built using decision trees (including gradient boosted decision trees), logistic regression, neural networks, or other algorithms or machine learning techniques. Diversity ranker 136 may be stored in search engine database 170.

Determining relevancy may include determining relevancy scores for each item listing within a recall for a search query. Unlike with conventional rankers, relevancy for diversity ranker 136 may be determined at least partly on diversity of features among the results rather than being determined independently of other item listings. Diversity may be determined from a comparison of feature values between item listings. Diversity ranker 136 generates a ranking of item listings that incorporates both individual relevance and comparative relevance of each item listing. For example, diversity ranker 136 may include a first model for generating a first ranking of item listings according to a relevancy of each item listing determined independently, and a second model that generates a second ranking that rearranges item listings within the first ranking at least partly based on diversity of features.

The first model may be trained using one or more known ranking algorithms that determine a first or initial ranking in which the position of each item listing is based on feature values of that item listing independent of other item listings. The second model utilizes the first ranking to generate a second ranking (referred to herein a diverse ranking) by rearranging one or more item listings based on a comparison of feature values of different item listings. The first model may provide a ranking based on conversion as a relevancy objective, and the second model may provide a new ranking based on conversion and diversity as relevancy objectives. Utilizing the first ranking may include the second model receiving as input either the relevancy scores determined by the first model or an order of item listings determined by the first model based on the relevancy scores.

To incorporate the diversity of item features, delta feature value determiner 134 computes the delta feature values for item listings. As previously stated, each item listing includes various features, and each feature has a feature value indicating a particular attribute of that item listing (e.g., $29.99 for price and free shipping for shipping type). The feature values for each feature may be stored in association with an item listing in one or more databases, such as search engine database 170, and these feature values may be used when ranking item listings independently by the first model, for instance. In addition to the feature value, a feature may also be associated with a delta feature value for a particular item listing. The delta feature value for a feature indicates a degree or magnitude of difference between the feature value for that particular item listing and the corresponding feature value of one or more other item listings within a ranking.

In some aspects, not all of the features are compared between item listings and, as such, not all features are associated with delta feature values. Features that are compared across item listings may sometimes be referred to herein as delta features. Delta features are features that are found as tending to influence a user's interest in selecting a particular item listing over others. As such, delta features may be features that are provided to the user within the search results. Some examples of delta features may include, without limitation, price, brand, product category, shipping type, shipping time, and return policy. Because delta feature is a label for a type of feature and for simplicity, a delta feature may be referred to herein as a feature unless otherwise noted to avoid confusion.

Turning back to delta feature value determiner 134, for a particular item listing, a delta feature value is determined in relation to other items listings within a predefined vicinity or neighborhood. The neighborhood may be defined by size and/or neighborhood type, which may be used to identify the neighborhood of a particular item listing within an existing order or ranking of listings. In exemplary aspects, the neighborhood for a particular item listing is determined by applying the neighborhood size and type to the first ranking generated by the first model. In one configuration, the neighborhood size is two. In other configurations, the neighborhood size is one, three, four, or five. It is contemplated that larger neighborhood sizes may be utilized.

Figure 2:
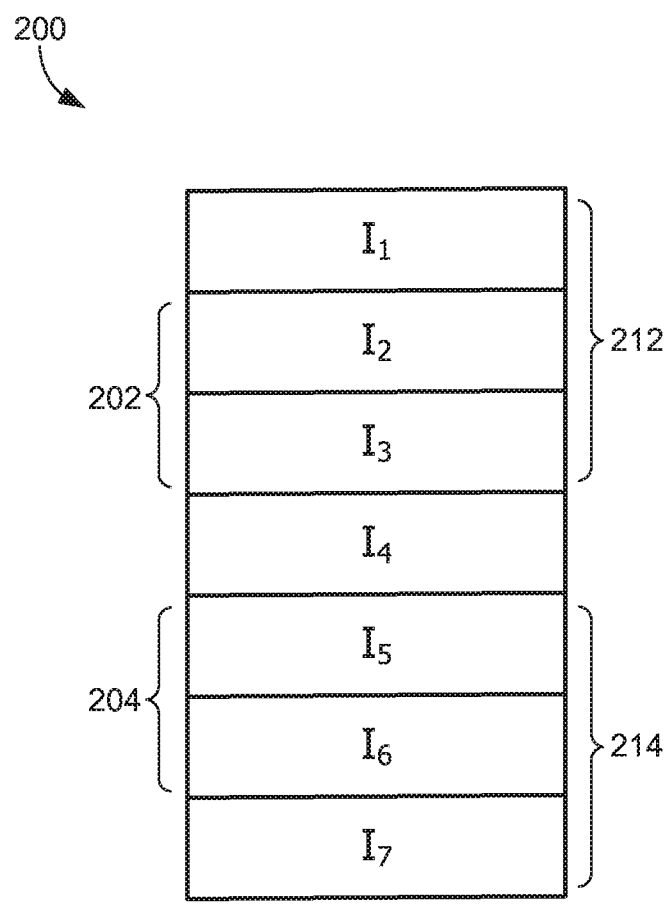
FIG. 2 is a schematic representation of an initial item listing ranking utilized in generating a diverse ranking in accordance with aspects described herein.

Further, the neighborhood type may indicate one or more directions for defining the neighborhood. For example, a neighborhood may be defined as higher (referring to higher-ranked item listings), lower (referring to lower-ranked item listings), or both (referring to both higher ranked and lower ranked item listings). The neighborhood type utilized in aspects of diverse results generator 130 is defined as either higher or both. FIG. 2 depicts a schematic representation of part of an initial item listing ranking 200, such as a ranking determined by the first model discussed above. Where a neighborhood size is two and defined in the higher direction, the neighborhood of item listing $I_4$ includes the two immediately preceding (higher ranked) item listings 202, and where the neighborhood is defined in both directions, the neighborhood of $I_4$ includes the two immediately preceding item listings 202 and the two immediately following (lower ranked) item listings 204. Further, where a neighborhood size is three, the neighborhood may include the three immediately preceding item listings 212 for a neighborhood defined in the higher direction, and where the neighborhood is defined in both directions, the neighborhood of $I_4$ includes the three immediately preceding item listings 212 and the two immediately following item listings 214. As described further herein, neighborhood size may vary for different ranking positions within the same ranking when the number of ranked item listings is less than the neighborhood size. Unless otherwise indicated, reference to the neighborhood size is the neighborhood size that is used for a majority of a ranking.

Delta feature value determiner 134 may determine the delta feature values after a search query is received and after a set of item listings is retrieved for the search query. Further, the determination of the delta feature values for item listings may be performed after an initial ranking of the item listings with the initial ranking being based on independent relevancy for each item listing. In some aspects, delta feature values are determined for only a portion of the initial ranking, where that portion may be the top ranked item listings when ranking using independently computed scores. In other words, delta feature values are not determined for every item listing but, rather, a top N item listings.

Computing the delta feature value may be based on the category of delta feature values. In some aspects, a delta feature value belongs to one of three categories: numerical delta feature values, categorical delta feature values, and Boolean delta feature values. Numerical delta features values are defined as the difference between the higher or lower item listing's feature value and the current item listing's feature value. For a neighborhood size of one, numerical delta feature values for item listing candidates of ranking position k are defined as the following where $f_k$ are the feature values for the particular candidate item listing:

$$D_{k1\_higher} = f_{k-1} - f_k$$

$$D_{k1\_lower} = f_{k+1} - f_k$$

For a neighborhood size greater than one, the numerical delta feature values are defined as:

$$D_{km\_higher} = \frac{1}{k} * \sum_{j=1}^{m} f_{k-j} - f_k$$

$$D_{km\_lower} = \frac{1}{k} * \sum_{j=1}^{m} f_{k+j} - f_k$$

For categorical features with discrete values, the delta feature values are defined as the count of the delta feature value occurring in the neighborhood, which may be represented as:

$$D_{km\_higher} = V[i-m:i].\text{count}(c)$$

$$D_{km\_lower} = V[i+m:i].\text{count}(c)$$

In the above, V is the array containing a feature's values, i is the index of the current item listing, c is the current item listing's feature value, and m is the neighborhood size.

Alternatively, categorical delta feature values may be defined as concatenation of the current item listing's features and the higher/lower item listing's features. For example, the categorical features may be defined as:

$$D_{k1\_higher} = \text{concatenate}(f_k, f_{k-1})$$

$$D_{k1\_lower} = \text{concatenate}(f_k, f_{k+1})$$

If a feature $f_k$ can take discrete values($x_1, x_2 \ldots x_n$), this representation ensures that a delta feature $x_1 x_2$ is not treated the same as $x_2 x_1$. In some configurations, defining categorical delta feature values based on concatenation is done when the neighborhood size being used is one.

Boolean delta feature values may be used to capture whether or not a particular delta feature is the same or different from another item listing within the neighborhood. For a neighborhood size m=1, Boolean delta feature values may be defined according to the following:

$$D_{k1\_higher} = 1, \text{ where } f_{k-1} = f_k$$

$$D_{k1\_higher} = 0, \text{ where } f_{k-1} \neq f_k$$

$$D_{k1\_lower} = 1, \text{ where } f_{k+1} = f_k$$

$$D_{k1\_lower} = 0, \text{ where } f_{k+1} \neq f_k$$

Where the neighborhood size m>1, Boolean delta feature values may be defined as:

$$D_{km\_higher} = V[i-m:i]\text{count}(c)$$

$$D_{km\_lower} = V[i+m:i]\text{count}(c)$$

In the above, V is the array containing a feature's values, i is the index of the current item, c is the current item's feature value, and m is the neighborhood size.

Diversity ranker 136 utilizes delta feature values computed by delta feature value determiner 134 to determine a ranking of item listings within the recall set. Generating the ranking is performed with one or more ranking models trained by training component 150. Training component 150 is configured to tune or train a model associated with diversity ranker 136 utilizing training data in training database 160. Training data in training database 160 may be collected from user behavior data (which may also be referred to as implicit relevance feedback) corresponding to a history of users and sessions where various users have made certain search queries, selections, and the like. The user behavior data may include, for example and without limitation, user search queries, previously provided search results, user clicks on item listings, user add-to-cart selections, and user purchases. Training data may also include search context data, including search category, date and time of search, user attributes, and location of user or user device.

The training data may include user behavior data from previous rankings that were based only on independently scored item listings, such as in conventional search systems. After diversity ranker 136 is initially trained, training data may also include user behavior data where the rankings are provided in accordance with this disclosure. In this way, diversity ranker 136 may be further tuned by learning from previous uses of diversity ranker 136. A portion of the training data is used for training, and a separate portion is used for validation.

Training the one or more models includes computing delta feature values for at least some features (i.e., delta features), in accordance with delta feature value determiner 134, and inputting the delta feature values into the model. Training component 150 determines weights to assign to these features during training. The weights indicate a degree to which that particular feature influences the relevancy score. Generally, where delta feature values are equal, greater weighted features have a greater influence on the relevancy score and, as such, may reflect a greater impact on the likelihood of an item being selected, added to cart, or purchased from the search results. Training diversity ranker 136, therefore, included identifying the features that tend to impact a user's decision in selecting an item listing when that feature is different in neighboring item listings. In exemplary configurations, only features having a weight that meets or exceeds a threshold weight are used as delta features by diversity ranker 136. At least some of the features not utilized as delta features may still be considered in generating the diverse ranking, but only the actual feature values (non-delta feature values) are used by diversity ranker 136. Further, a delta feature may be associated with different weights for different search contexts, such as when different search categories or other search parameters are selected by the user.

A ranking function used by the diversity model may include:

$$f_s(x_i) = (w_b \cdot b_i) + (w_d \cdot D(S, d_i))$$

In the above function, S represents the set of item listings added to the diverse ranking result set and, $x_i$ represents a candidate item listing i to be added next to the result set. Additionally, $w_b$ denotes weights for non-delta feature values (which may also be referred to herein as "best match feature values"); $w_d$ denotes weights of delta feature values; $b_i$ denotes non-delta feature values for item listing $x_i$; $d_i$ denotes delta feature values for item listing $x_i$; and $D(S, d_i)$ denotes diversity of item listing $x_i$ with respect to items in S. As such, this function incorporates independent feature values with delta feature values that are dependent on other item listings. This list-wise loss function may be used in a model to sequentially generate a diverse ranking list.

Sequential ranking includes identifying an item listing for each ranking position. Sequential ranking includes diversity ranker 136 placing the most relevant item listing in the first ranking position and then moving on to fill lower ranking positions. Further, placing item listings in a first set of ranking positions may be based only on independently-determined relevancy scores without consideration of delta feature values. The number of positions within the first set may be based on how the neighborhood is defined for diversity ranker 136, and in exemplary configurations, the number of positions within the first set is smaller than the neighborhood size for most of the ranking. For example, where diversity ranker 136 utilizes a neighborhood size of five and the neighborhood type is "higher" items, at least the first ranking position may be filled based on a relevancy score determined without delta feature values, and subsequent ranking positions may be filled using delta feature values based on higher ranked item listings. The sixth ranking position, for instance, may be determined at least partly using delta feature values computed by comparing each candidate item listing to the item listings within the first five ranking positions, and the seventh ranking position may be determined at least partly using delta feature values computed by comparing each candidate item listing to item listings within positions two through six.

In exemplary configurations, the neighborhood size varies within a ranking such that some ranking positions are filled using delta feature values computed in accordance with a neighborhood size smaller than the neighborhood size used for most of the ranking where there are not enough ranked item listings to utilize the greater neighborhood size. For example, where a neighborhood size is five, the first item listing from the first ranking may remain as the first item listing for the second ranking, and filling the second ranking position is determined at least using delta feature values calculated with a neighborhood size of one (e.g., delta feature values based on the first item listing). Filling the third ranking position may then be based on delta feature values calculated with a neighborhood size of two (e.g., delta feature values based on the first and second item listings), and subsequent ranking positions may be based on delta feature values similarly calculated with increasing neighborhood sizes until, at the sixth ranking position, the neighborhood size reaches five. All subsequent ranking positions may then be filled according to a neighborhood size of five.

In alternative configurations, the neighborhood size does not necessarily change with each higher ranking position. For example, where the general neighborhood size is five, the first three item listings may be positioned based only on the first ranking; the fourth and fifth ranking positions may be filled using a neighborhood size of three; and the sixth and subsequent ranking positions may be filled using the neighborhood size of five.

In further alternative configurations, the neighborhood size does not change. Continuing with the example of a neighborhood size of five, the first five ranking positions are filled based on a relevancy score determined without delta feature values (i.e., from the first ranking). The sixth and subsequent ranking positions may then be filled at least partly based on delta feature values computed according to a neighborhood size of five.

In an example configuration, training component 150 trains a baseline model and a diversity model on the same training data except the baseline model is trained without delta feature values. The diversity model may be trained utilizing a LamdaMART learning-to-rank algorithm. In a configuration of the disclosed technology actually reduced to practice, training component 150 trained the baseline model and trained the diversity model using different neighborhood sizes (m=3 and 5) and using different neighborhood types (higher, lower, both). Mean reciprocal sale rank (MRR), which captures the first result that involves an item sale, was used as a metric to evaluate and compare the performance of the diversity model relative to the baseline model. Table 1 below includes the percentage increase in MRR for neighborhood sizes 3 and 5 when using the diversity model after the initial ranking with the baseline model compared to using only the ranking with the baseline model. As such, in each instance in the below table, utilizing the diversity model resulted in more relevant search results, which would reduce the need to perform additional searching.

TABLE 1

Percentage change in MRR relative to baseline model resulting in various diversity models

| Neighborhood Size | Higher | Lower | Both |
|---|---|---|---|
| 3 | 4.65 | 4.45 | 5.01 |
| 5 | 3.05 | 3.55 | 4.52 |

Using one or more models trained by training component 150, diversity ranker 136 generates a ranking for a search query submitted by a user. In generating the ranking, diversity ranker 136 use the trained diversity model with the search query and delta feature values as input. Further, diversity ranker 136 may utilize a first ranking generated by a baseline model based on relevancy scores for each item listing determined independently of other item listings as input. Additionally, regular feature values and search context data may be input into the trained diversity model.

Although diversity ranker 136 has been disclosed herein as utilizing two ranking models to ultimately generate the diversity ranking, diversity ranker 136 may utilize a single model, such as a neural network, to determine item listings to put within the top subset of ranking positions based on independently computed relevancy scores and determine item listings to put within subsequent ranking positions using delta feature values.

Continuing with enhanced search engine 120, diversity indicator component 140 is generally responsible for generating one or more indicators of diversity features for a ranking of diverse search results created by diverse results generator 130. As illustrated in FIG. 1, an diversity indicator component 140 may include diversity feature determiner 142 and indicator generator 144.

Diversity feature determiner 142 is generally responsible for determining one or more distinguishing delta features for item listings within the diverse results ranking. In exemplary aspects, the distinguishing delta feature, referred to herein as the diversity feature, is the delta feature with the highest influence or impact on placing a particular item listing in a particular ranking position compared to other delta features. The diversity feature for a particular item listing may be determined based on impact scores for the delta features values for that item listing. As diversity ranker 136 determines a ranking placement for the particular item listing, the diversity ranker 136 determines the impact scores for the delta feature values that resulted in the ranking placement. The impact scores may be determined based on a weight of the delta feature (representing an importance of that particular feature as described above with respect to diversity ranker 136) and the delta feature value for that item listing (representing a magnitude of difference with other item listings). Greater weights and/or greater delta feature values generally result in greater impact scores.

After impact scores are determined for delta feature values for a particular item listing, the feature corresponding to the delta feature value with the highest impact score is selected as the diversity feature. As such, determining the diversity feature may include comparing the impact scores of delta feature values for an item to determine the highest impact score and identifying the feature associated with the highest impact score. Determining the diversity feature also may include comparing impact scores to a threshold score and only selecting a feature as the diversity feature if the associated impact score satisfies (e.g., meets or exceeds) the threshold. Comparing the impact score to a threshold may be done as a filtering step for impact sores for all delta features prior to selecting the highest impact score. In other aspects, the highest impact score for a particular item listing is identified before it is determined whether that highest impact score satisfies the threshold.

In some aspects, multiple diversity features may be identified for an item listing. Multiple diversity features, for instance, may be identified where two or more delta feature values each have the highest impact score. Alternatively, multiple diversity features may be determined by identifying a set (e.g., two or more) of delta feature values with the highest impact scores. As an example, two diversity features may be identified based on the associated delta feature values having the highest and second highest impact scores for an item listing.

Once one or more diversity features for an item listing are determined, indicator generator 144 generates an indicator representing each diversity feature to provide to the user in association with the item listing. The indicator may be a visual or audio representation of the diversity feature.

In one example, indicator generator 144 modifies a graphic user interface to provide a visual indication of the diversity feature within an interface component for an item listing. The interface component may be an item card or may generally be referred to as the item listing. Generally, an item card for an item listing includes indicators for several features related to the item listing (such as features related to an item for sale or the seller), and these indicators may be text, images, icons, and the like. For instance, an item card may include a text indicator "$49.99" for a price feature. A visual indicator provided by indicator generator 144 may be include a change to the font or formatting of an existing indicator (such as highlighting or bolding an existing text feature indicator) for the diversity feature or the addition of a new text, image, or icon indicator. Examples of visual indicators of diversity features are discussed further below with reference to FIGS. 3A to 3D.

It is contemplated that alternatively or in addition to a visual indicator, indicator generator 144 may create an audio representation of the diversity feature. For example, audio output reciting the diversity feature or a value of the diversity feature may be provided. An example of audio indicators of diversity features is discussed further below with reference to FIG. 3E.

The diversity feature indicator represents a feature and indicates that the feature is different than other item listings, such as higher-ranked listings, within the results. For instance, a text indicator for a feature may be highlighted on one item card while a text indicator for that feature on another item card within the results is not highlighted. The use of a particular visual indicator on one item card and not another provides a visual signal to a user that the feature is a diversity feature in that it distinguishes one item listing from another. Further, the indicator distinguishes the diversity feature from other features within that item listing. In other words, the diversity feature is not presented to the user in the same manner as other features for that same item listing. For instance, an icon may be present for the diversity feature within an item listing but not for other features, or the diversity feature may be indicated with bold text while other features in the item listing are not in a bold font.

Having ranked the set of search results retrieved by item listing retriever 132 using diversity ranker 136 and generating diversity feature indicators by diversity indicator component 140, enhanced search engine 120 provides the ranked set of diverse search results to the computing device 105 for presentation to a user using an interface of computing device 105.

Examples of diversity feature indicators for an example ranked set of search results are illustrated in FIGS. 3A-3E. The search results may be determined by enhanced search engine 120 as provided in FIG. 1. FIGS. 3A-3E each depicts a graphic user interface with a visual presentation of a search engine website associated with a search engine. The search engine website illustrated includes search query 305 (e.g. "Nike"), and the search results for search query 305 are shown as a set of item listings 310. Item listings 310 may be provided in response to entering search query 305. Each item listing may include indicators for several features. For instance, each item listing within item listings 310 (including listings 310a through 310h) includes an image 312, an item name 314, a price 315, an item type 316 (e.g., new or used), a purchase option 317 (e.g., buy it now or auction), and a category or subcategory 320. Item listings may also include indicators for shipping type 322 and a return policy 328.

The ranking of item listings 310a-310h may be determined by diverse results generator 130 in FIG. 1 such that the positioning of at least some item listings is partly based on differences with higher-ranked items. As an example, for the search query 305 of "Nike", item listings for men's athletic footwear, women's athletic footwear, apparel, sporting goods, and other items may be identified as matching the query (which may be done by result retriever 132 of FIG. 1). If it is determined that, individually, men's athletic footwear tends to have higher relevance (e.g., sellability) to the search query 305, item listings for men's footwear may be traditionally ranked higher than other items. However, if a user passes over item listings for men's athletic footwear without selecting a listing, the user may be interested in a different type of item other than men's footwear). As such, at least one of the item listings, such as item listing 310*c*, may be ranking within the set of item listings at least partly according to item listing 310*c* being for a category of items that is different from the higher-ranked item listings 310*a* and 310*b* (e.g., men's athletic footwear).

Figure 3A:
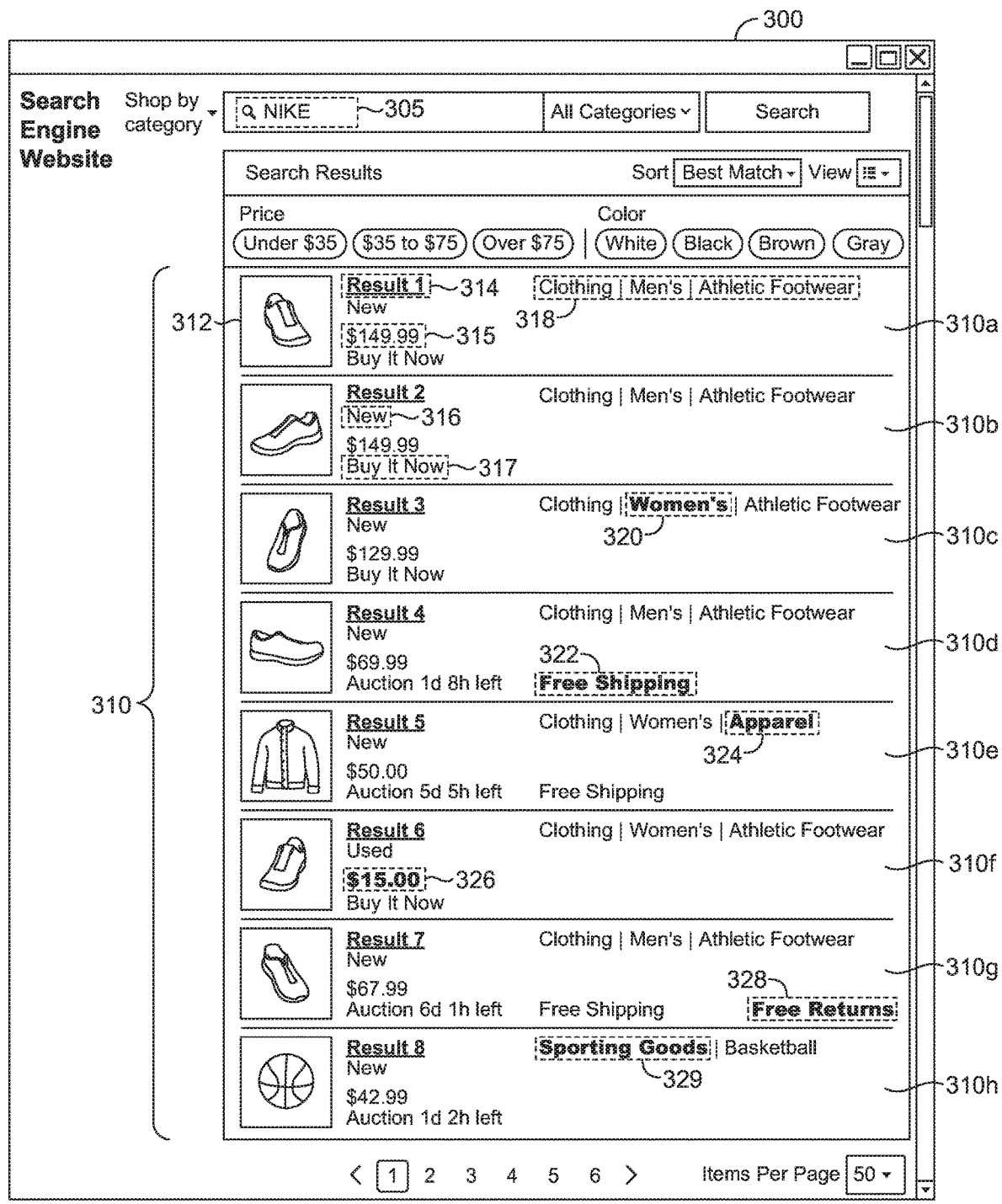
FIGS. 3A-3E are screenshots of example graphical user interfaces (GUIs) having example diverse search results generated in accordance with aspects described herein.

At least some of the item listings within the set 310 include a diversity feature indicator representing a feature that distinguishes that item listing from other item listings. In GUI 300 of FIG. 3A, for example, the diversity feature indicators are bolded text indicators for a feature. For example, item listing 310*c* is for an item within the subcategory of women's athletic footwear, unlike the previous two listings 310*a* and 310*b* for items within the subcategory of men's athletic footwear. As such, diversity feature indicator 320 is in a bold text font while the corresponding feature in item listings 310*a* and 310*b* is in a non-bold text font. Similarly, the subcategory of apparel for item listing 310*e* is represented by diversity feature indicator 324 in bold font, which distinguishes it from other item listings (e.g., 310*a*-310*d*) for footwear. The use of the bold font type serves as a visual indicator that the bolded feature (subcategory) is different in that item listing than other item listings without the user specifically needing to identify that the category is different by comparing the categories of the item listings. FIG. 3A also includes diversity feature indicators 322, 326, and 328, and 329 for item listings 310*d*, 310*f*, 310*g* and 310*h*, respectively.

Figure 3B:
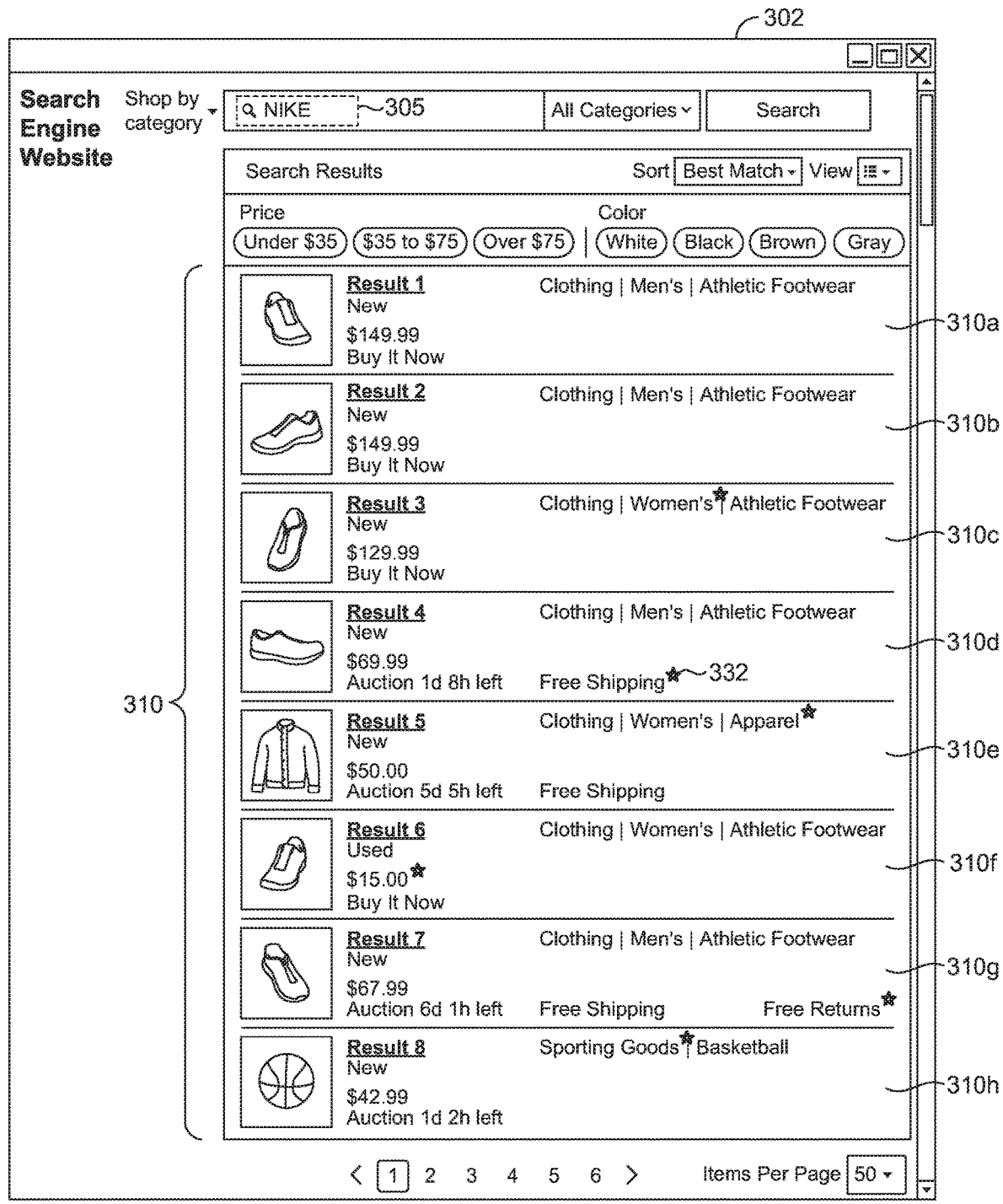
Figure 3C:
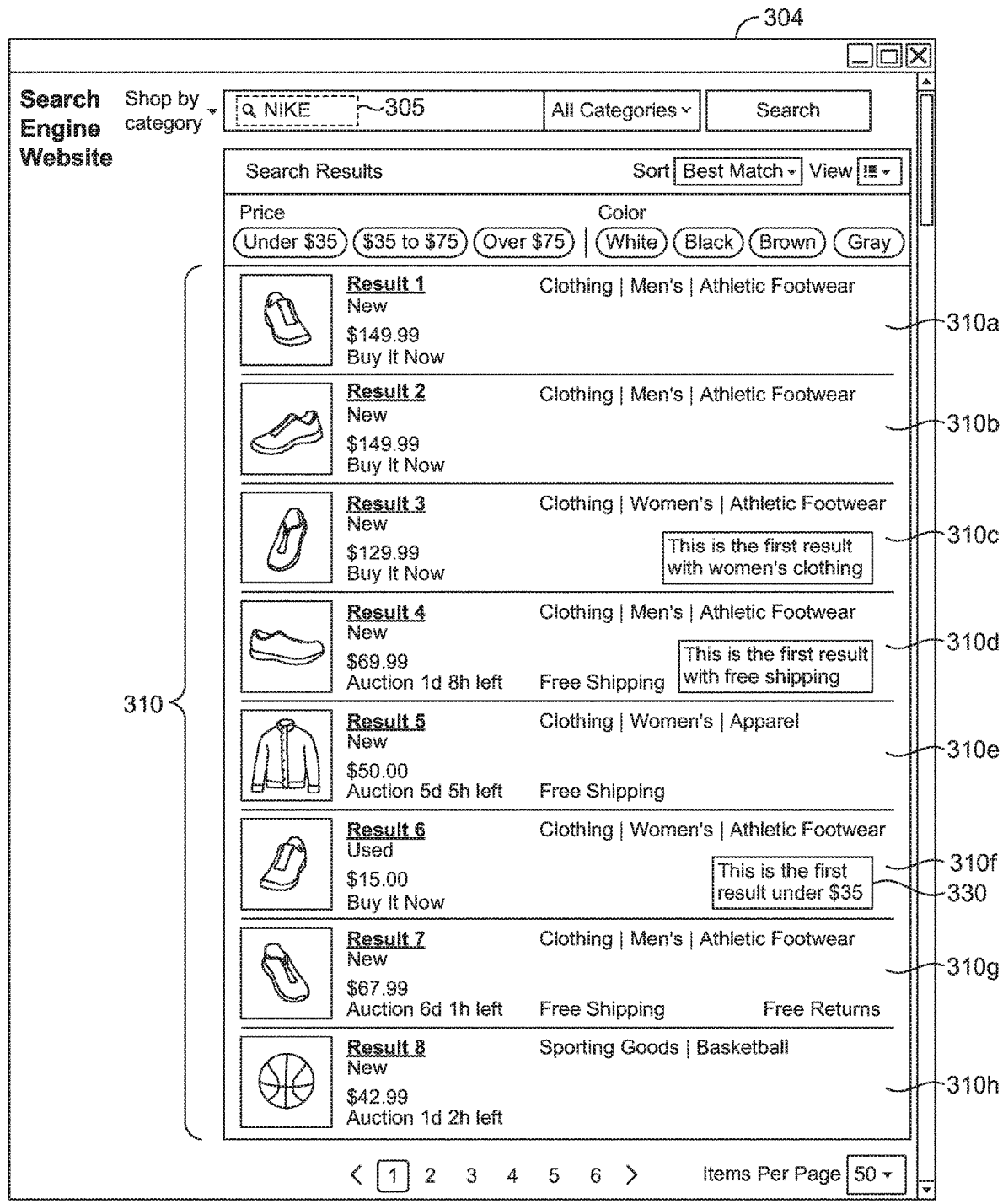

FIG. 3A depicts how a previous feature indicator (e.g., plain text) may be modified (e.g., replaced with bold text) to indicate a diversity feature. FIGS. 3B and 3C depict examples in which the diversity feature indicator is added to the item listing. In example GUI 302 of FIG. 3B, icons are used as diversity feature indicators. For instance, icon 332 is added adjacent a text indicator for "Free Shipping" on item listing 310*d*, distinguishing the shipping option on item listing 310*d* from higher-ranked item listings. In GUI 304 of FIG. 3C, additional text indicators are added to diverse item listings. For example, diversity feature indicator 330 for item listing 310*f* includes additional text identifying item listing 310*f* as being different from other item listings because it the price is under $35. For simplicity, diversity feature indicators are only illustrated on some item listings in FIG. 3C, but it is contemplated that any of the item listings 310*b* through 310*h* may have a diversity feature indicator.

In some instances, a dynamic GUI may be provided with diversity feature indicators being provided based upon some triggering event, such as user interaction. For example, in GUI 306 in FIG. 3D, diversity feature indicator 340 for item listing 310*c* includes a pop-up message. The pop-up message 340 may be displayed within GUI 306 when the cursor 342 is placed or hovers over that particular item listing 310*c* to explain how that item listing is different from other item listings. When the cursor is moved away from item listing 310, the diversity feature indicator 340 may disappear. If the cursor is moved to another item listing, such as item listing 310*d*, a new pop-up message may appear. In this way, the item listings 310 may initially not appear to have a diversity feature indicator, but one or more diversity feature indicators are presented to the user when the user moves the cursor over an item listing that is associated with a diversity feature indicator.

Figure 3D:
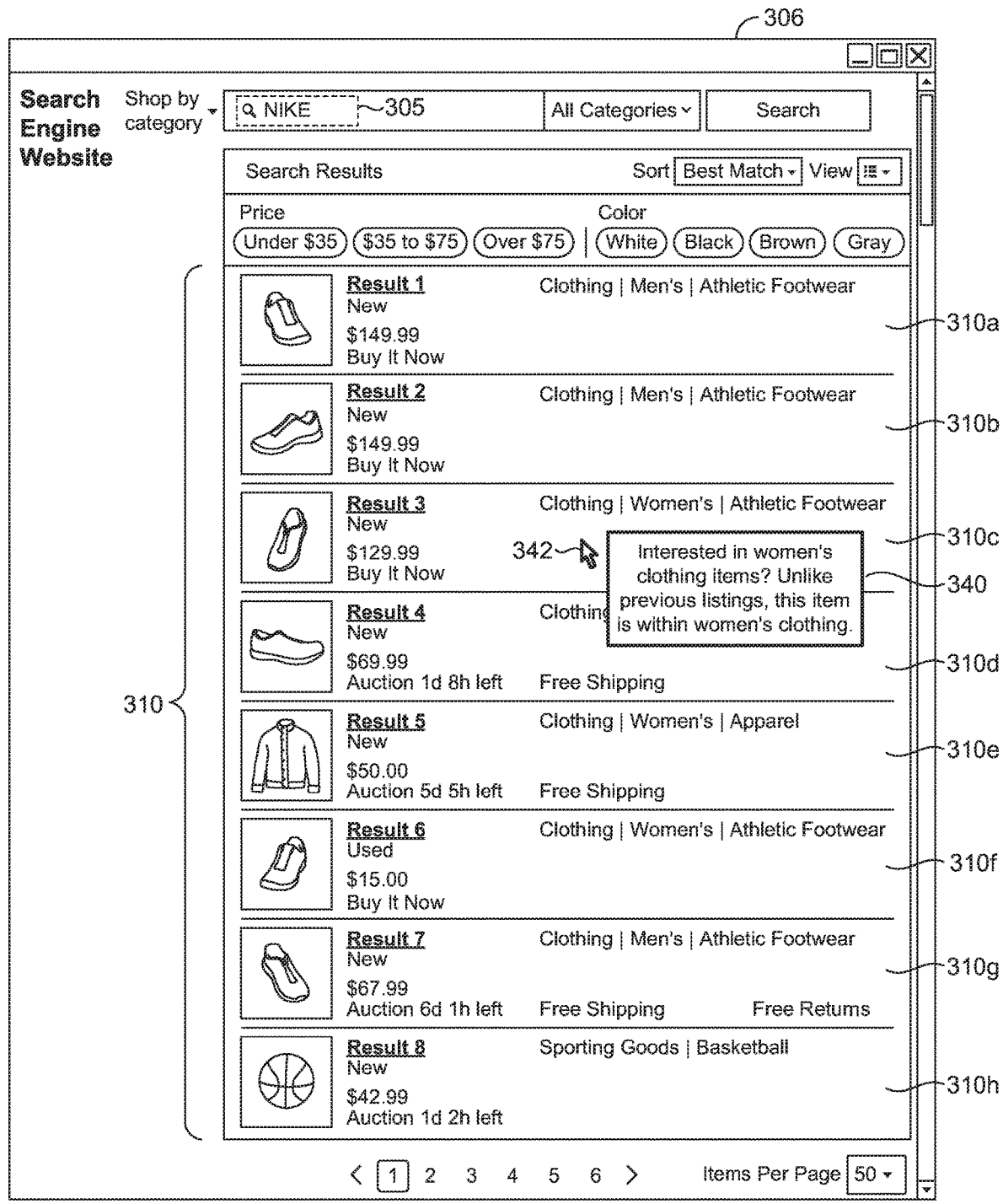

It is contemplated that other types of user interaction may be utilized as a triggering event for presenting a diversity feature indicator to a user. For example, a diversity feature indicator may be provided upon a click, swipe, a single tap, a double tap, or other user interaction with a touch screen or input device. In another configuration, user interaction may be in the form of eye tracking or head gait tracking such that a diversity feature indicator is presented upon an indicator (via eye tracking or head gait tracking) that a user is focused on the item listing corresponding to the diversity feature indicator. Alternatively or additionally, the triggering event for dynamically providing a diversity feature indicator may be the occurrence of a predetermined amount of time. Further, although FIG. 3D illustrates a pop-up message as the diversity feature indicator 340 presented upon a triggering event, additional or alternative formats of diversity feature indictors may be dynamically presented, such as a change in text format (e.g., highlighting, bolding, italicizing, changing text size or color), an icon, an animation, or an image transition where a presently displayed image (such as image 312 in FIG. 3A) is changed to an icon or image relating to the diversity feature.

Figure 3E:
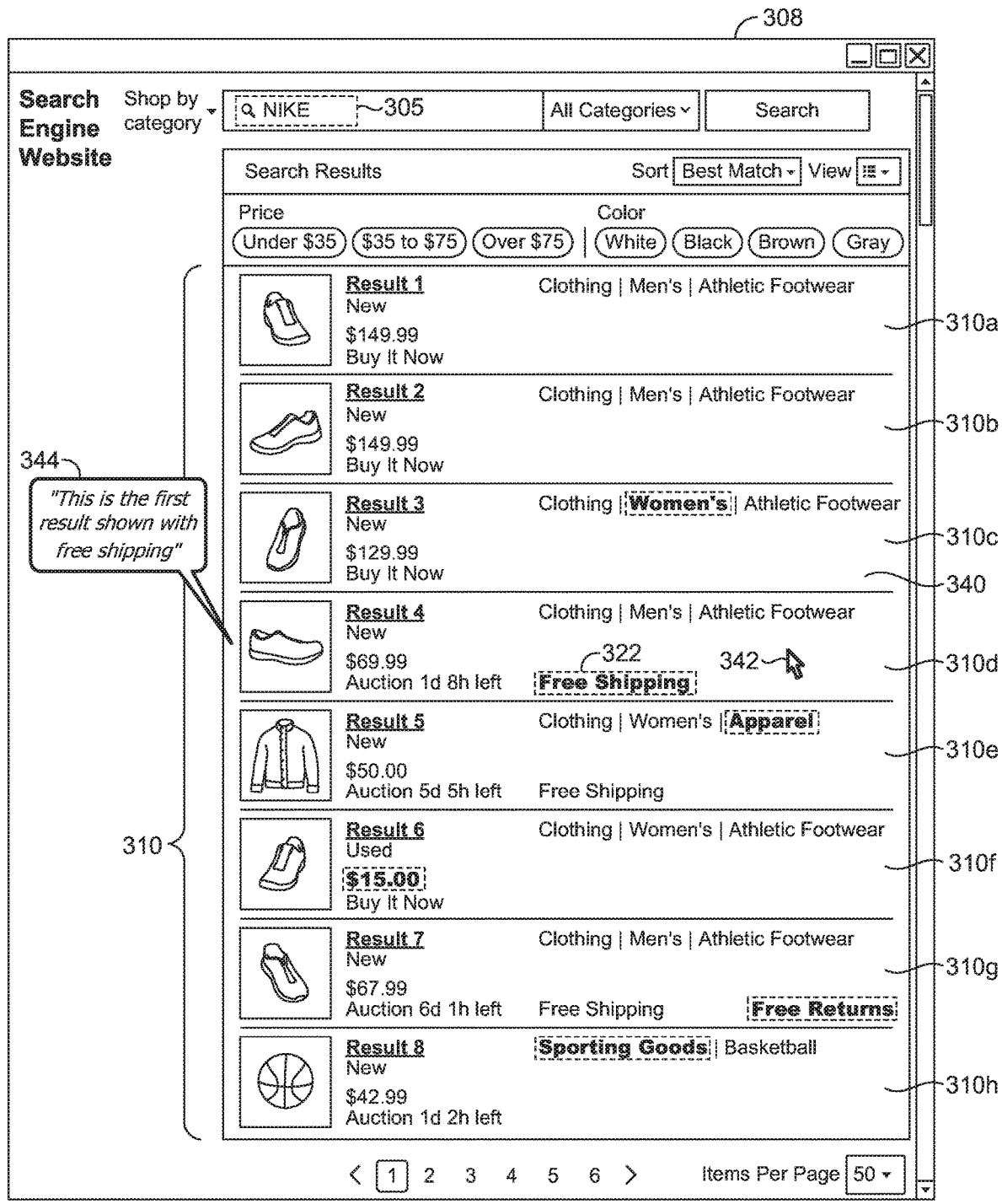

Diversity feature indicators may be also provided in multiple formats for the same item listing. For instance, an item listing may have both an icon added and a font changed for the same diversity feature. Additionally, a diversity feature indicator may not be limited to a visual indicator. For example, FIG. 3E illustrates GUI 308 with the set of item listings 310, and when cursor 342 is placed over item listing 310*d*, an auditory diversity feature indicator 344 is output to a user. In the example, diversity feature indicator 344 is an audio message stating, "This is the first result shown with free shipping.", distinguishing item listing 310*d* from higher-ranked item listings based on the available shipping option. FIG. 3E also illustrates multiple formats for the diversity feature indicator being used. In addition to auditory diversity feature indicator 344, item listing 310*d* includes diversity feature indicator 322 that incudes bolded text identifying the free shipping option feature that distinguishes item listing 310*d* from other item listings. This textual diversity feature indicator 322 may be presented on GUI 308 regardless of whether the cursor 342 is placed over time listing 310*d* as suggested with similar textual diversity feature indicators being presented for other item listings in FIG. 3E. But it is also contemplated that the textual diversity feature indicators may appear only upon a triggering event, such as placement of cursor 342 over the corresponding item listing.

Figure 4:
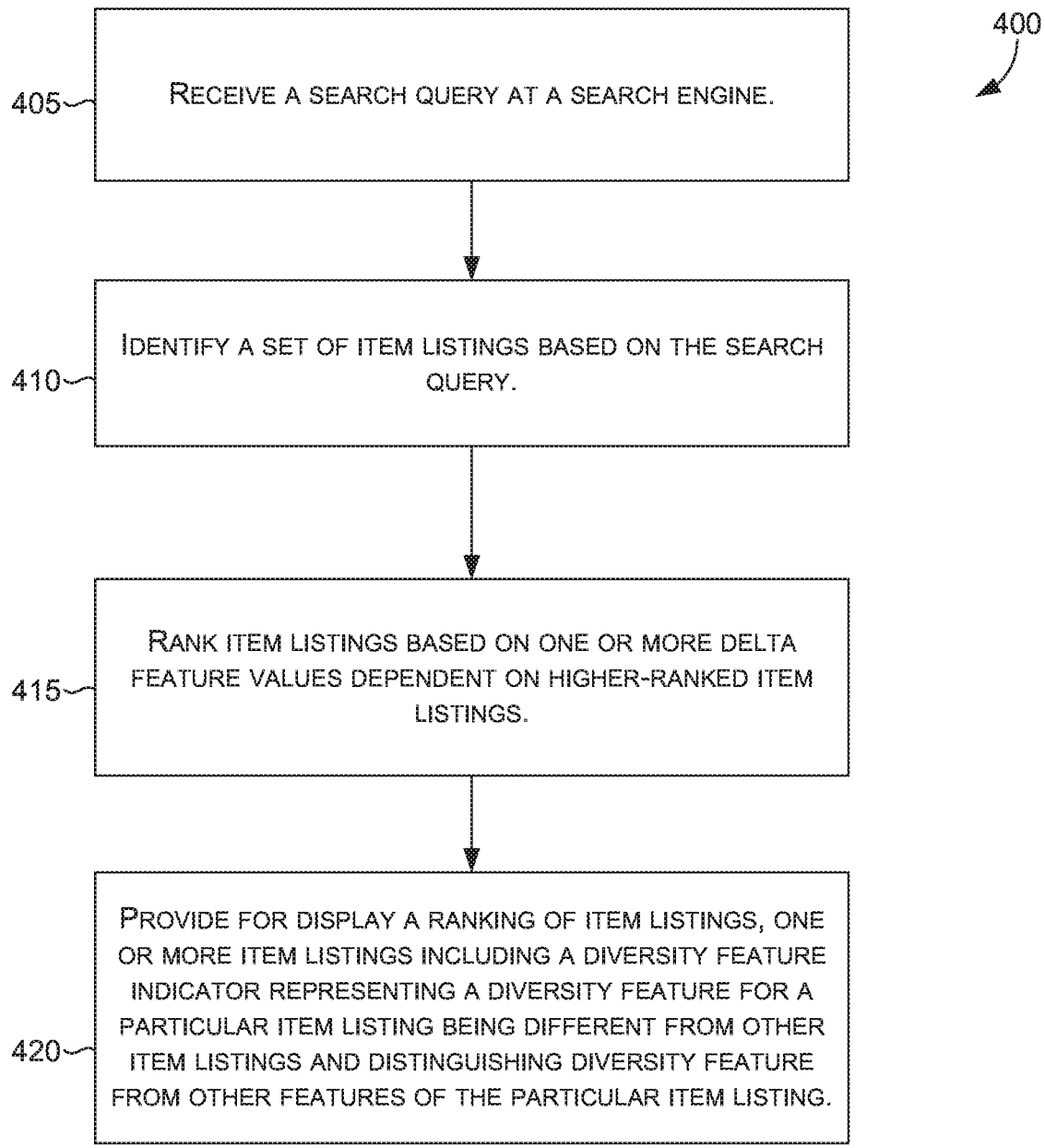
FIGS. 4 and 5 are block diagrams illustrating example methods for providing diverse search results, in accordance with aspects described herein.
Figure 5:
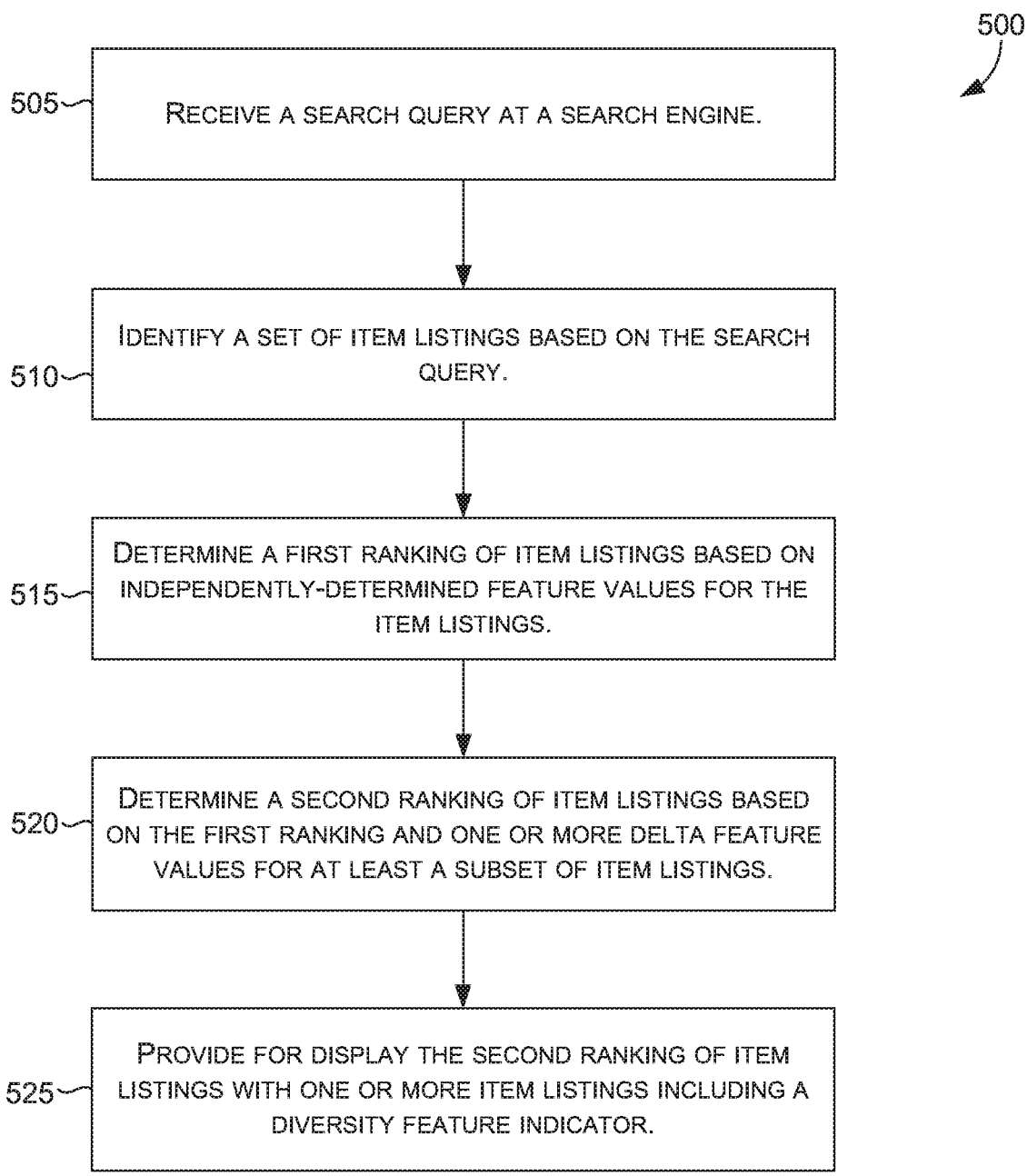

With reference to FIGS. 4 and 5, block diagrams are provided to illustrate methods for generating diverse search results. The methods may be performed using a search system, such as enhanced search engine 120 of FIG. 1. One or more computer storage media have computer-executable instructions embodied thereon that, when executed by one or more processors, cause the processor(s) to perform the methods in the search system. It should be understood that, unless where indicated otherwise, the order of steps provided in FIGS. 4 and 5 is not required for all examples of the disclosed technology. It should also be understood that methods 400 and 500 may each include additional steps.

With reference now to FIG. 4, a block diagram is provided illustrating example method 400 for providing diverse search results. At block 405, a search query is received. The search query may be received at a search engine, such as enhanced search engine 120 of FIG. 1, from a user entering the search query. For instance, the user may enter the search query at an associated search engine website. At block 410, a set of item listings are identified based on the search query. For example, the set of item listings are identified as being relevant to the search query as described with respect to item listing retriever 132 of FIG. 1.

At block 415, item listings within the set of item listings are ranked based, in part, on one or more delta feature values for at least a subset of item listings. The delta feature values are dependent on higher-ranked item listings. For example, the delta feature values may indicate a degree or magnitude of difference with other item listings with respect to a particular feature. Block 415 may be performed as described with respect to diversity ranker 136 of FIG. 1. Method 400 may further include determining delta feature values, which may be performed by delta feature value determiner 134 of FIG. 1.

At block 420, the ranking of item listings is provided for display as search results for presentation at a client computing device. At least some item listings provided for display include a diversity feature indicator that visually or audibly represent a diversity feature for a particular item listing being different from higher-ranked item listings. The diversity feature indicator also distinguishes the diversity feature from other features in the particular item listing. Example diversity feature indicators are described with respect to FIGS. 3A-3E. In some aspects, an item listing may include multiple diversity feature indicators for the same diversity feature and/or have multiple diversity feature indicators for different diversity features.

Method 400 may include identifying the diversity feature for a particular item listing out of other features. Identifying the diversity feature may be performed in accordance with diversity feature determiner 142 of FIG. 1, and the diversity feature may be a feature associated with the delta feature value having the greatest impact score.

With reference now to FIG. 5, a block diagram is provided illustrating example method 500 of generating diverse search results. At block 505, a search query is received. The search query may be received at a search engine from a user. At block 510, a set of item listings are identified based on the search query. For example, item listings within the set are identified as being relevant to the search query as described with respect to item listing retriever 132 of FIG. 1.

At block 515, a first ranking of item listings within the set of item listings is determined based on independently-determined feature values for the item listings. At block 520, a second ranking is determined based on the first ranking and one or more delta feature values for at least a subset of item listings. The delta feature values are dependent on higher-ranked item listings. For example, the delta feature values may indicate a degree or magnitude of difference with other item listings with respect to a particular feature. In some examples of method 500, the first ranking is for a first subset of item listings within the set of item listings, and the second ranking is for a second subset of item listings that are ranked below the first subset. Blocks 515 and 520 may be performed as described with respect to diversity ranker 136 of FIG. 1. Method 500 may further include determining delta feature values, which may be performed by delta feature value determiner 134 of FIG. 1.

At block 525, the second ranking is provided as search results to the user, for example, by communicating the ranked set of item listings to a computing device for presentation. At least some item listings provided for display indicate a diversity feature indicator that represents a diversity feature for a particular item listing being different from higher-ranked item listings. The diversity feature indicator may also distinguish the diversity feature from other features in the item listing. Example diversity feature indicators are described with respect to FIGS. 3A-3E.

Having described an overview of configurations of the present technology, an example operating environment in which configurations of the present technology may be implemented is described below in order to provide a general context for various aspects of the present technology. Referring initially to FIG. 6, in particular, an example operating environment for implementing configurations of the present technology is shown and designated generally as computing device 600. Computing device 600 is but one example of a suitable computing environment and is not intended to suggest any limitation as to the scope of use or functionality of the technology. Neither should computing device 600 be interpreted as having any dependency or requirement relating to any one or combination of components illustrated.

The technology of the present disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that performs particular tasks or implement particular abstract data types. The technology may be practiced in a variety of system configurations, including hand-held devices, consumer electronics, general-purpose computers, more specialty computing devices, etc. The technology may also be practiced in distributed computing environments where tasks are performed by remote-processing devices that are linked through a communications network.

With reference to FIG. 6, computing device 600 includes bus 610 that directly or indirectly couples the following devices: memory 612, one or more processors 614, one or more presentation components 616, one or more input/output ports 618, one or more input/output components 620, and illustrative power supply 622. Bus 610 represents what may be one or more busses (such as an address bus, data bus, or combination thereof). Although the various blocks of FIG. 6 are shown with lines for the sake of clarity, delineating various components is not so clear in reality, and metaphorically, the lines would more accurately be grey and fuzzy. For example, one may consider a presentation component, such as a display device, to be an I/O component. Also, processors have memory. It is recognized that such is the nature of the art, and it is reiterate that the diagram of FIG. 6 is merely illustrates an example computing device that can be used in connection with one or more configurations of the present technology. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer storage media in the form of volatile or nonvolatile memory. Memory 612 may be removable, non-removable, or a combination thereof. Example hardware devices include solid-state memory, hard drives, optical-disc drives, etc. Computing device 600 includes one or more processors that read data from various entities such as memory 612 or I/O components 620. Presentation component(s) 616 present data indications to a user or other device. Examples of presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc.

Configurations described above may be combined with one or more of the specifically described alternatives. In particular, a configuration that is claimed may contain a reference, in the alternative, to more than one other configuration. The configuration that is claimed may specify a further limitation of the subject matter claimed.

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" or "block" might be used herein to connote different elements of methods employed, the terms should not be interpreted as implying any particular order among or between various steps herein disclosed unless and except when the order of individual steps is explicitly stated.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or "transmitters" using communication media described herein. Also, the word "initiating" has the same broad meaning as the word "executing" or "instructing" where the corresponding action can be performed to completion or interrupted based on an occurrence of another action. In addition, words such as "a" and "an," unless otherwise indicated to the contrary, include the plural as well as the singular. Thus, for example, the constraint of "a feature" is satisfied where one or more features are present. Also, unless otherwise indicated, the term "or" includes the conjunctive, the disjunctive, and both.

From the foregoing, it will be seen that this technology is one well adapted to attain all the ends and objects described above, including other advantages which are obvious or inherent to the structure. It will be understood that certain features and subcombinations are of utility and may be employed without reference to other features and subcombinations. This is contemplated by and is within the scope of the claims. Because many possible configurations of the described technology may be made without departing from the scope, it is to be understood that all matter described herein or illustrated the accompanying drawings is to be interpreted as illustrative and not in a limiting sense.

What is claimed is:

1. A computer-implemented method for providing a visualization of diverse search results, the computer-implemented method comprising:
receiving a search query at a search engine;
identifying a set of item listings based on the search query;
ranking item listings within the set of item listings based at least partly on one or more delta feature values for at least a subset of item listings, the one or more delta feature values being dependent on higher-ranked item listings within the set of item listings;
providing for display the ranking of item listings as search results for the search query; and
based upon a hover interaction with a particular item listing of the item listings, providing a diversity feature indicator for the particular item listing of the item listings within the ranking of item listings that disappears when a cursor is moved away from the particular item listing of the item listings, wherein the diversity feature indicator visually represents a diversity feature for the particular item listing being different than higher-ranked item listings and visually distinguishes the diversity feature from other features identified in the particular item listing, and further wherein the diversity feature indicator includes a pop-up message displayed within a user interface corresponding to the search engine, the pop-up message explaining how the particular item listing is different from other item listings.

2. The computer-implemented method of claim 1, further comprising identifying the diversity feature for the particular item listing based on a set of delta feature values indicating a degree of difference in feature values between the particular item listing and other item listings within the set of item listings.

3. The computer-implemented method of claim 2, wherein identifying the diversity feature for the particular item listing comprises determining an impact value for each delta feature value within the set of delta feature values, the impact value measuring an amount of influence that the delta feature value had on ranking the particular item listing.

4. The computer-implemented method of claim 3, wherein the diversity feature is identified for the particular item listing based on having the highest impact value relative to other delta feature values for that particular item listing.

5. The computer-implemented method of claim 1, wherein the diversity feature indicator comprises a textual feature indicator that is formatted differently than indicators for corresponding features in other item listings and other features in the particular item listing.

6. The computer-implemented method of claim 1, wherein the diversity feature indicator comprises an icon or image that is displayed with a textual indicator of the diversity feature.

7. The computer-implemented method of claim 1, wherein diversity feature indicators for different item listings represent different features.

8. The computer-implemented method of claim 1, wherein features corresponding to the one or more delta feature values comprise shipping type, price, and item category.

9. The computer-implemented method of claim 1, wherein ranking the item listings within the set of item listings comprises determining one or more feature values independently of other item listings and determining the one or more delta feature values for at least a subset of item listings based on feature values of higher-ranked item listings.

10. The computer-implemented method of claim 9, wherein, for each item listing within the subset of item listings, the one or more feature values determined independently are combined with the one or more delta feature values.

11. One or more computer storage media having computer-executable instructions embodied thereon that, when executed by one or more processors, cause the one or more processors to perform a method for providing diverse search results, the method comprising
receiving a search query at a search engine;
identifying a set of item listings based on the search query;
providing for display a ranking of item listings as search results for the search query; and
based upon a hover interaction with a particular item listing of the item listings, providing a diversity feature indicator for the particular item listing of the item listings within the ranking of item listings that disappears when a cursor is moved away from the particular item listing of the item listings, wherein the diversity feature indicator visually represents a diversity feature for the particular item listing being different than higher-ranked item listings and visually distinguishes the diversity feature from other features identified in the particular item listing, and further wherein the diversity feature indicator includes a pop-up message displayed within a user interface corresponding to the search engine, the pop-up message explaining how the particular item listing is different from other item listings.

12. The computer storage media of claim 11, wherein the method further comprises determining the ranking of item listings based at least partly on one or more delta feature values for at least a first subset of item listings, the one or more delta feature values being dependent on higher-ranked item listings within the set of item listings, wherein the particular item listing is within the first subset.

13. The computer storage media of claim 12, wherein a second subset of item listings are not presented with diversity feature indicators.

14. The computer storage media of claim 13, wherein the second subset of item listings are ranked higher than the first subset of item listings.

15. The computer storage media of claim 14, wherein the second subset of item listings are not ranked based on delta feature values.

16. A search system for providing diverse results, the system comprising:
one or more processors; and
one or more computer storage media storing computer-useable instructions that, when used by the one or more processors, cause the one or more processors to:
receive a search query at a search engine;
identify a set of item listings based on the search query;
for at least a subset of item listings, determine delta feature values for one or more features of the subset of item listings, each delta feature value indicating a degree of difference between an item listing and other item listings within the set of item listings with respect to a feature;
rank item listings within the set of item listings based at least partly on the delta feature values; and
provide for display the ranking of item listings as search results for the search query; and
based upon a hover interaction with a particular item listing of the item listings, provide a diversity feature indicator for the particular item listing of the item listings within the ranking of item listings that disappears when a cursor is moved away from the particular item listing of the item listings, wherein the diversity feature indicator visually represents a diversity feature for the particular item listing being different than higher-ranked item listings and visually distinguishes the diversity feature from other features identified in the particular item listing, and further wherein the diversity feature indicator includes a pop-up message displayed within a user interface corresponding to the search engine, the pop-up message explaining how the particular item listing is different from other item listings.

17. The search system of claim 16, wherein the diversity feature indicator represents the diversity feature for the particular item listing being different from only a portion of higher-ranked item listings.

18. The search system of claim 16, wherein identifying the diversity feature for the particular item listing comprises determining an impact value for each delta feature value, the impact value measuring an amount of influence that the delta feature value had on ranking the particular item listing.

19. The search system of claim 16, wherein each diversity feature indicator is a visual indicator.

20. The search system of claim 19, wherein diversity feature indicators for different item listings visually represent different features.

* * * * *